United States Patent
Wei et al.

(10) Patent No.: US 9,858,964 B1
(45) Date of Patent: Jan. 2, 2018

(54) DATA STORAGE DEVICE WITH POWER LOSS ADAPTATION

(71) Applicant: Seagate Technology, LLC, Cupertino, CA (US)

(72) Inventors: Bo Wei, Singapore (SG); CheeHou Peng, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/452,159

(22) Filed: Mar. 7, 2017

(51) Int. Cl.
| | | |
|---|---|---|
| G11B 21/02 | (2006.01) | |
| G11B 20/18 | (2006.01) | |
| G11B 5/012 | (2006.01) | |
| G11B 5/09 | (2006.01) | |
| G11B 20/12 | (2006.01) | |

(52) U.S. Cl.
CPC .......... *G11B 20/1803* (2013.01); *G11B 5/012* (2013.01); *G11B 5/09* (2013.01); *G11B 20/1217* (2013.01); *G11B 20/1816* (2013.01); *G11B 2020/1238* (2013.01); *G11B 2020/1823* (2013.01)

(58) Field of Classification Search
None
See application file for complete search history.

(56) References Cited

U.S. PATENT DOCUMENTS

| | | | |
|---|---|---|---|
| 7,562,239 B2 | 7/2009 | Fung | |
| 7,715,951 B2 | 5/2010 | Forbes, Jr. et al. | |
| 7,907,364 B2 * | 3/2011 | Boyle | G11B 5/09 360/60 |
| 8,131,401 B2 | 3/2012 | Nasle | |
| 8,700,923 B2 | 4/2014 | Fung | |
| 8,732,501 B1 | 5/2014 | Ghose et al. | |
| 8,850,243 B2 | 9/2014 | Rallo | |
| 8,873,178 B2 * | 10/2014 | Erden | G11B 20/1217 360/39 |
| 9,026,812 B2 | 5/2015 | Ravindranath et al. | |
| 9,047,932 B1 * | 6/2015 | Nicholls | G11C 5/147 |
| 9,130,825 B2 | 9/2015 | Wilkinson | |
| 9,177,607 B2 * | 11/2015 | Yulizar | G11B 27/36 |
| 2012/0116696 A1 | 5/2012 | Wank | |

* cited by examiner

*Primary Examiner* — K. Wong
(74) *Attorney, Agent, or Firm* — Hall Estill Attorneys at Law

(57) ABSTRACT

A data storage device can employ a transducing head that accesses data stored on a data storage medium as directed by a controller. In response to experiencing a power disruption, the controller can predict at least one performance metric lost due to the power disruption and subsequently compensate for the power disruption by assuming the at least one predicted performance metric is correct.

20 Claims, 2 Drawing Sheets

DATA STORAGE DEVICE WITH POWER LOSS ADAPTATION

SUMMARY

A data storage device, in accordance with assorted embodiments, has a transducing head that accesses data stored on a data storage medium as directed by a controller. In response to experiencing a power disruption, the controller predicts at least one performance metric lost due to the power disruption prior to compensating for the power disruption by assuming the at least one predicted performance metric is correct.

DETAILED DESCRIPTION

As data storage devices and systems become increasingly sophisticated with greater data capacity and faster data access speeds, performance metrics are consistently monitored and evaluated to mitigate errors, structural variability, and operational variability. While logging one or more performance metrics for a data storage device can maintain optimal data storage operation, the practice results in the data storage device being susceptible to power disruptions that unexpectedly diminish, or remove, electrical power from the device.

For instance, power loss from an inadequate power supply, unstable host system, or manual removal of a device without first notifying software (no safely remove hardware selection) can result in performance metrics being lost and device performance being subsequently hampered as the device attempts to discover then rebuild/repair errors experienced during normal data access operations. As another example, multiple instances of power disruption, particularly in a short time interval (<1 minute), can result in cyclic and widespread system errors that can jeopardize the capacity and operating potential of the data storage device. Hence, there is a continued industry and consumer interest in data storage devices and systems that provide high data storage performance while being less susceptible to power disruptions.

Figure 1:
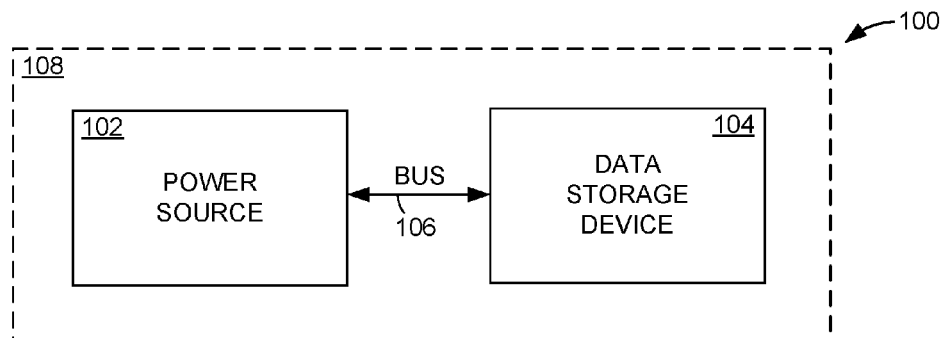
FIG. 1 displays an example data storage system that may be employed in accordance with various embodiments.

Various embodiments can be employed in the example data storage system 100 of FIG. 1. The system 100 can employ any number and types of power sources 102 to supply electrical power to one or more data storage devices 104. That is, a power source 102 may be any physical size, physical location relative to the data storage device 104, power capacity, and type of electrical current while the data storage device 104 is not limited to a particular type of memory device, such as hard disk drives (HDD), solid state memory, hybrid memory, and combinations thereof.

It is contemplated that the power source 102 is physically located within a housing of the data storage device 104. In yet, the non-limiting example of FIG. 1 illustrates how the power source 102 can be connected to the data storage device 104 via at least one interconnect 106 attached to a bus, which may be any conduit capable of transmitting electrical power with or without an electrical ground, such as a universal serial bus (USB). The power source 102 may be physically and electrically connected to multiple data storage devices 104 in a storage enclosure 108 that can be fit into a data storage rack as part of a collective data storage environment, such as those utilized in cloud computing and large data storage capacity situations.

Figure 2:
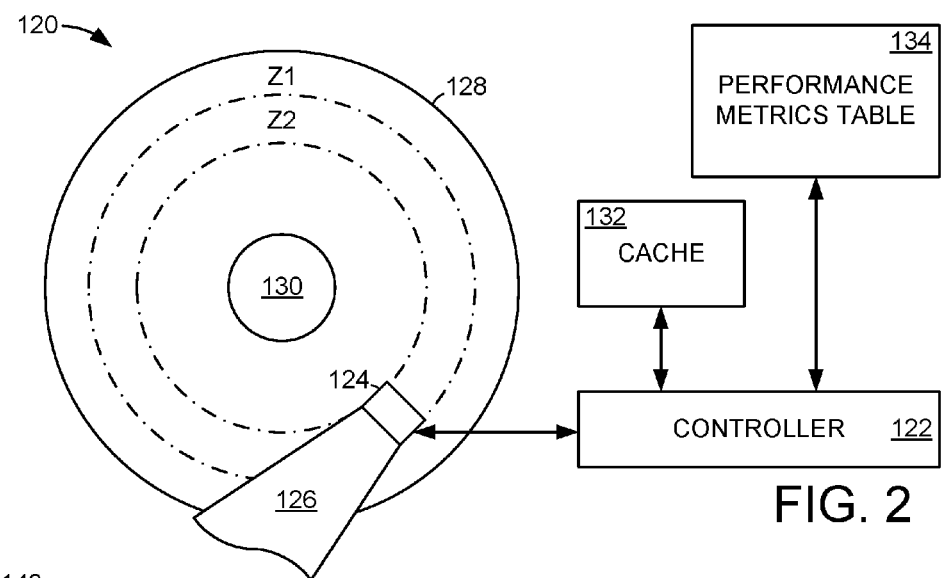
FIG. 2 is a line representation of an example portion of data storage device that can be utilized in the data storage system of FIG. 1.

Although not required, at least one data storage device 104 of the data storage system 100 can be configured with a HDD. FIG. 2 conveys a line representation of an example HDD data storage device 120 that can be utilized in the data storage system 100 of FIG. 1 in accordance with some embodiments. The HDD 120 may employ one, or more, controllers 122, such as a microprocessor, that directs physical movement of a transducing head 124 via an actuating suspension 126 along with rotation of a magnetic data storage medium 128 via a central spindle 130. The controller 122 further directs data access operations to, and from, one or more zones (Z1 & Z2) of the data storage medium 128 from a cache 132, such as a separate memory or a portion of the medium 128, which can involve writing and/or reading of data. It is noted a zone can be a data track or band or multiple data tracks that circumferentially extend about the spindle.

The controller 122 may continuously, routinely, sporadically, and randomly monitor data access operations and log one or more performance metrics in a performance metric table 134. The table 134 may be resident on a separate memory or on a designated portion of the data storage medium 128, without limitation. The number and type of performance metric logged by the controller 122 is not limited and can consist of, at least, write counts to a particular data storage location, such as a data track, cache metadata, adjacent track interference (ATI), side track erasure (STE), bit error rate (BER), data write times, locations of disk errors, and structural variability, such as thermal asperities.

Figure 3:
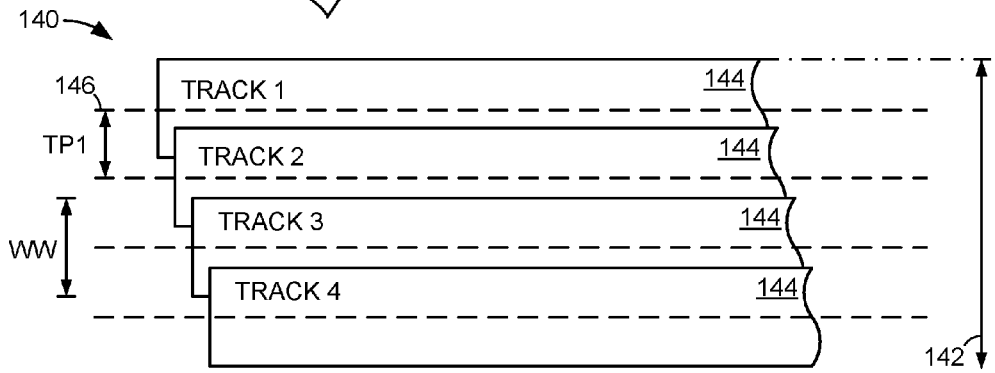
FIG. 3 depicts a line representation of an example portion of a data storage medium capable of being used in the data storage device of FIG. 2.

In some embodiments, the data storage medium 128 employs a shingled magnetic recording (SMR) where data tracks are partially overlapping. A data storage device with an SMR data storage medium 128 can be particularly susceptible to power disruptions while a band of data tracks are being sequentially written. FIG. 3 illustrates a top view line representation of a portion of an SMR data storage medium 140 that can be used in the device 120 of FIG. 2 and the system 100 of FIG. 1. The SMR medium 140 has a data band 142 that has a plurality of data tracks 144 that each has a longitudinal track centerline 147 that bisects the track 144 and corresponds with the center of a data writer.

The data band 142 can contain any number of data tracks 144 that are written by a data writer of a transducing head 124 with a writer width (WW). The overlapping orientation of the respective data tracks 144 allow more data tracks 144 to be positioned on the data storage medium 140 than if the tracks 144 were non-overlapping. It is noted that the respective position of adjacent data tracks 144 can be characterized as the track pitch (TP1), which may be uniform, or different, between various tracks 144 of the data band 142 and will be less than the WW.

The overlapping configuration of the data tracks 144 is produced by sequentially writing data tracks 144 across the data band 142. With a power disruption, an unfinished, partially written, data band 142, the writing location and cached data awaiting being written are lost, which causes the content of the data band 142 to be completely re-compiled and subsequently re-written at a high time and system resource expense. In the event of multiple power disruptions, a data band 142 may degrade system performance by cyclically re-compile and attempt to re-write. Hence, various embodiments are directed to intelligently adapting to power disruptions to reduce system time-to-ready after a disruption and mitigate the performance hindering effects of the disruptions.

Figure 4:
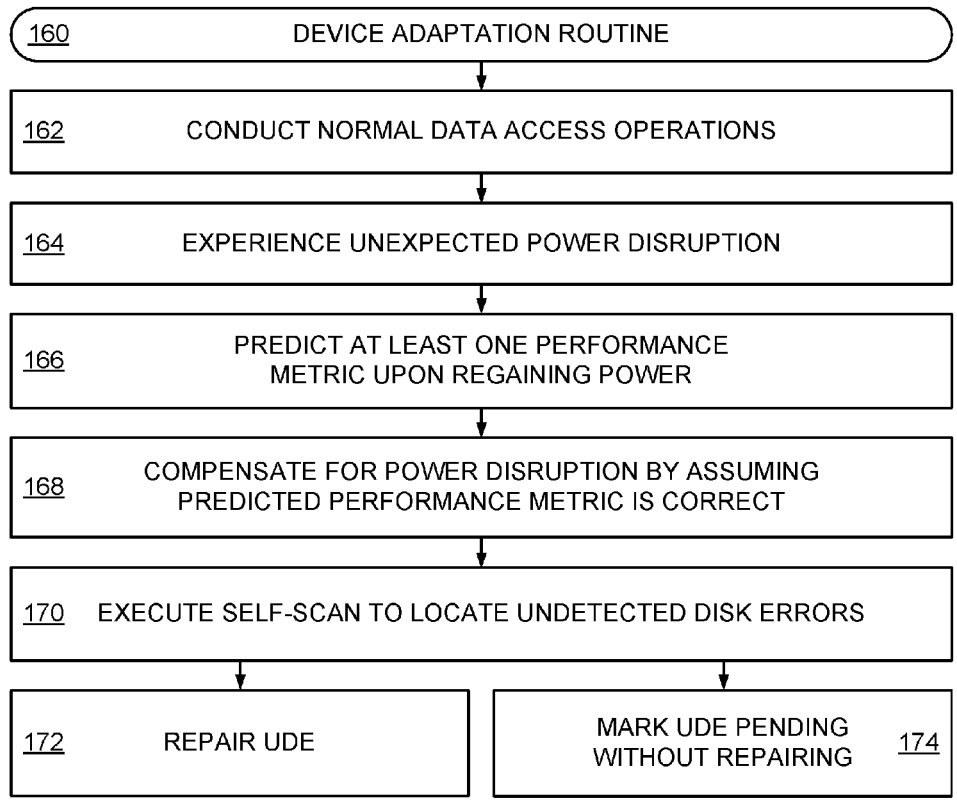
FIG. 4 provides a flowchart of an example device adaptation to sudden power loss routine that can be carried out with the data storage system of FIG. 1.

FIG. 4 is a flowchart of an example data storage device adaptation routine 160 that is executed by a system controller, such as controller 122 of FIG. 2, to intelligently adapt to power disruptions. The routine 160 begins with any end-user conducting one or more data access operations, such as user-generated data being stored to, or read from, user data regions of a data storage medium in step 162. It can be appreciated that the controller logs one or more performance metrics of data storage operation(s) during step 162. The operations of step 162 are intended to be conducted in a consumer environment, such as being connected to a home computer, mobile computing device, or a network attached node. Hence, routine 160 occurs after a data storage device has been fully manufactured, tested, and shipped to an end-user.

While step 162 can be continuously executed, or repeated, for any amount of time, at some point the data storage device will experience a power disruption in step 164. A power disruption can be any loss, reduction, pause, or alteration in nominal power delivery characteristics that diminish, or cut-off, operation of at least a system controller. The power disruption of step 164 can be detected in real-time or after-the-fact by one or more sensors, by the controller itself, or by an external power monitoring mechanism. The detected power disruption triggers step 166 to predict one or more performance metrics upon regaining full operational power. Such prediction can be executed by a local, or remote, controller that utilize one or more algorithms with a pre-existing model and/or previously logged activity from the particular data storage device experiencing the power disruption. That is, a controller can employ general performance metric models that apply to a broad spectrum of data storage devices or specific logged operational performance from the disrupted data storage device to predict performance metrics lost during step 164.

The performance metric(s) predicted in step 166 are then used to compensate for the power disruption. The manner of compensation is step 168 is not limited to a particular process, but in some embodiments, entails adding predicted metrics to existing tables to provide a "worst case scenario" that ensures the data storage device fully recovers from the power disruption. For example, a number of directed offline scan (DOS) write counts to a data storage medium is estimated in step 166 and added to a DOS table in step 168. As another non-limiting example, step 168 can utilize predicted ATI, STE, thermal asperities, or BER performance metrics to alter the normal device start up procedure to prevent data access errors and carry out any pending data access operations.

The compensation of step 168 can be conducted alone or in conjunction with a device self-scan in step 170 that locates any previously undetected disk errors (UDE), such as those resulting from the power disruption of step 164. In some embodiments, step 170 is executed after step 168 alters one or more data access parameters to take into account the predicted performance metric(s). Hence, the self-scan in step 170 can be conducted at any time, such as during low system overhead, system idle, at start-up immediately following the power disruption, or after the controller alters normal operating parameters.

In the event the self-scan of step 170 discovers a UDE, routine 160 can repair the UDE in step 172, which may involve writing, re-writing, or reading data. Step 170 may also trigger step 174 to mark the UDE as pending without repairing the error, which allows a controller to skip the error location without cyclically retrying and subsequently timing out from a data access operation. Thus, routine 160 can repair or discard a UDE to optimize data storage operations after the power disruption of step 166.

Although routine 160 can adapt to an experienced power disruption in intelligent ways, the occurrence of multiple power disruptions, particularly in a short time interval like within 10 seconds of each other, can result in excessive system degradation as the controller cyclically attempts to predict, compensate, and verify performance variables. Accordingly, a data storage system can be configured to recognize frequent power disruptions and intelligently determine how to adapt to preserve data storage performance and integrity.

Figure 5:
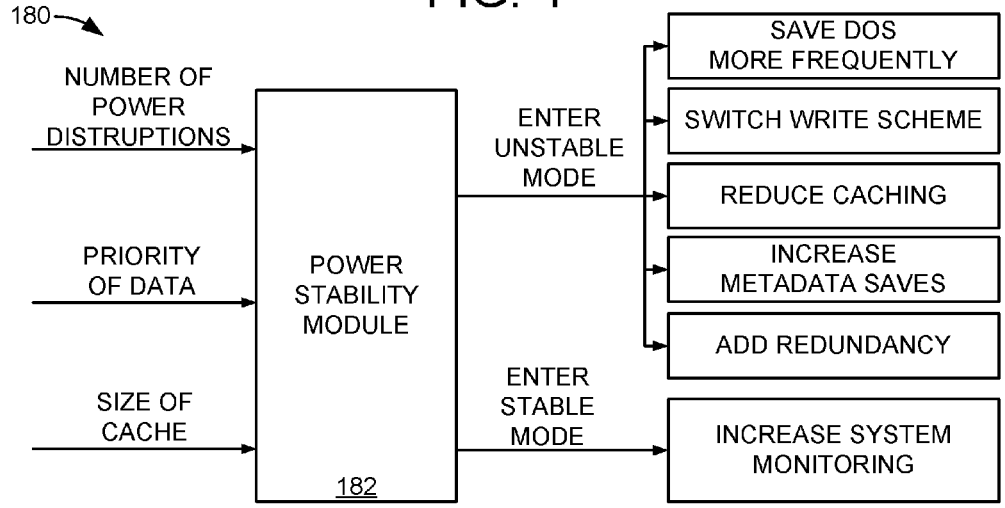
FIG. 5 conveys a block representation of an example portion of a data storage device that may be used in accordance with various embodiments by the data storage system of FIG. 1.

FIG. 5 displays a block representation of an example power stability system 180 that may be employed by the data storage system 100 of FIG. 1 to determine the stability of power in accordance with various embodiments. The power stability system 180 has a power stability module 182, such as an application specific integrated circuit (ASIC) or a microprocessor, that may be internal, or external, to a data storage device. The power stability module 182 can continuously or intermittingly log the activity of a data storage device to determine at least the number of power disruptions over time, the priority of data at the time of encountered power disruption(s), and the size of a data cache prior to a power disruption.

These, and other, information about power disruptions can be processed by the power stability module 182 to determine the stability of power. If the power is deemed stable based on the inputs, the data storage device enters a stable mode with nominal data access operations and heightened system monitoring for a predetermined time, such as one minute or hour. Such heightened system monitoring may involve increased performance metric logging and analysis as well as longer retention of logged data.

Based on the inputs, the power stability module can trigger the data storage device to enter a power unstable mode where one or more actions are taken by the controller to mitigate the effects of multiple power disruptions. While not exhaustive, the power unstable mode may save DOS parameters more frequently, increase the frequency of metadata saves, and reduce the amount of cached data. With SMR data storage devices, the power unstable mode may switch writing schemes from data band writes to data band re-writes, which first writes data to a scratch-pad portion of the data storage medium, non-volatile memory, or volatile memory, prior to consecutively writing the data tracks of a data band.

It is contemplated that a power unstable mode adds redundancy to a data storage system by storing copies of data, metadata, and/or performance metrics in multiple places. An unstable power mode may be conducted for any amount of time, but can last for a predetermined amount of time or until the power stability module 182 alters the device operating condition to the power stable mode. Hence, a controller can continuously or sporadically re-evaluate the power mode of a data storage device to ensure that the performance sacrificed by the actions of the unstable power mode are not conducted for longer than necessary to protect long-term device storage performance.

With modern data storage devices utilizing sophisticated performance monitoring schemes, data storage can be optimized, but at the expense of being more susceptible to power disruptions where logged performance metrics are lost. The ability to intelligently adapt to power disruptions by predicting lost performance metrics and compensating data access operations reduces the data storage device accumulated field returns (AFR) and allows the device to return to the full performance capabilities available before the power disruption. The intelligent adaptation to multiple power disruptions further reduce the damage, or exposure to power loss, while processing data in a safer manner when in a power unstable mode. Thus, various embodiments temporarily sacrifice device performance to improve robustness and long-term data storage capabilities.

It is to be understood that even though numerous characteristics and advantages of various embodiments of the present disclosure have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   accessing data stored on a data storage medium with a transducing head as directed by a controller, the data, data storage medium, transducing head, and controller assembled into a data storage device;
   experiencing a plurality of power disruptions;
   predicting at least one performance metric lost due to a first power disruption of the plurality of power disruptions with the controller; and
   compensating for the first power disruption by assuming the at least one predicted performance metric is correct;
   logging the plurality of power disruptions with a power stability module connected to the controller;
   altering the controller from a stable power mode to an unstable power mode as directed by the power stability module; and
   reducing data storage performance of the data storage device during the unstable power mode as directed by the power stability module to mitigate the effects of the future power disruptions.

2. The method of claim 1, wherein the controller predicts a worst case scenario for the at least one lost performance metric.

3. The method of claim 1, wherein the first power disruption is physically removing a power supply from the controller.

4. The method of claim 1, wherein the reduced data storage performance of the unstable power mode changes data write schemes performed on the data storage medium.

5. The method of claim 1, wherein the at least one performance metric is a adjacent track interference measurement.

6. The method of claim 1, wherein the at least one performance metric is a number of writing errors.

7. The method of claim 1, wherein the at least one performance metric is a media cache metadata size.

8. The method of claim 1, wherein the controller compensates for the power disruption by re-writing data to the data storage medium.

9. The method of claim 1, wherein the controller compensates for the power disruption by marking a data sector as pending without re-writing the data sector.

10. A method comprising:
    accessing data stored on a data storage medium with a transducing head as directed by a controller, the data, data storage medium, transducing head, and controller assembled into a data storage device;
    experiencing a first power disruption;
    predicting at least one performance metric lost due to the first power disruption with the controller;
    compensating for the first power disruption by assuming the at least one predicted performance metric is correct;
    experiencing a second power disruption;
    logging the first and second power disruptions with a power stability module connected to the controller;
    altering the controller from a stable power condition to an unstable power condition as directed by the power stability module; and
    reducing data storage performance of the data storage device by adding redundant copies of data on the data storage medium during the unstable power mode as directed by the power stability module to mitigate the effects of the future power disruptions.

11. The method of claim 10, wherein the controller compensates for the first power disruption upon a reconnection of power and execution of a boot up sequence.

12. The method of claim 10, wherein the controller saves a performance metric table more frequently during the unstable power condition.

13. The method of claim 10, wherein the controller writes data to a scratch pad then to a shingled band prior to repairing a damaged portion of the shingled band with redundant data from the scratch pad in response to an encountered power loss.

14. The method of claim 10, wherein the controller reduces data storage performance during the unstable power condition by reducing a volume of data cached prior to being written to the data storage medium.

15. The method of claim 10, wherein the controller reduces data storage performance during the unstable power condition by increasing the frequency of media cache metadata being saved.

16. The method of claim 10, wherein the power stability module evaluates a number of power disruptions over a given time period, a priority of data being written to the data storage medium, and a size of a data cache to activate the unstable power condition.

17. The method of claim 10, wherein the controller executes a self-scan after each power disruption in response to a system idle time indicated by the controller.

18. An apparatus comprising data stored on a data storage medium and accessed by a transducing head as directed by a controller, the controller connected to a power stability module configured to alter from a stable power mode to an unstable power mode in response to multiple logged power disruptions, the unstable power mode corresponding to reduced data storage performance as directed by the power stability module to mitigate the effects of future power disruptions, the controller configured to predict at least one performance metric lost from an experienced power disruption and subsequently compensate for the power disruption by assuming the at least one predicted lost performance metric is correct.

19. The apparatus of claim 18, wherein the power stability module, data storage medium, transducing head, and controller are assembled together as a single data storage device.

20. The apparatus of claim 19, wherein the data storage device is connected to an external power supply via a bus.

* * * * *